April 22, 1952　　　A. J. WILLIAMS, JR　　　2,593,950
MOTOR CONTROL SYSTEM
Filed Dec. 6, 1950

INVENTOR.
ALBERT J. WILLIAMS, JR.
BY
Woodcock and Phelan
ATTORNEYS

Patented Apr. 22, 1952

2,593,950

UNITED STATES PATENT OFFICE 2,593,950

MOTOR CONTROL SYSTEM

Albert J. Williams, Jr., Philadelphia, Pa., assignor to Leeds and Northrup Company, Philadelphia, Pa., a corporation of Pennsylvania Application December 6, 1950, Serial No. 199,537

14 Claims. (Cl. 318—28)

This invention relates to self-balancing systems such as utilized in recording, controlling and indicating equipment, and has for an object the provision of a simple and reliable system for controlling the speed of the balancing motor so that the speed of the motor is proportional to the square root of the unbalance-signal.

The present invention relates in general to systems of the type disclosed in my Patents Nos. 2,113,164 and 2,113,436. In the first-named patent, the method of speed control may be described as a subtractive method because the voltage from the tachometer is subtracted from the unbalance voltage and the sign of the remainder is used to determine the direction of motor torque. In accordance with the present invention, a voltage which varies with the speed of the rebalancing motor is utilized in two ways: first, it is utilized to control the gain of an early stage of an amplifier. Accordingly, since the output of said stage equals unbalance times gain, and since gain is the controlled variable which accomplishes speed control of the motor, it will be seen that there is provided, not a subtractive method but rather a multiplying method of controlling the speed of the motor, since with a change of gain the output of said stage varies as a product of the changed gain times the unbalance-signal. Second, the voltage varying in accordance with the speed of the motor is introduced into a later stage of the amplifier in manner such that the double use of said voltage controls the speed of the rebalancing motor to make it substantially proportional to the square root of the unbalance-signal.

Figure 1:
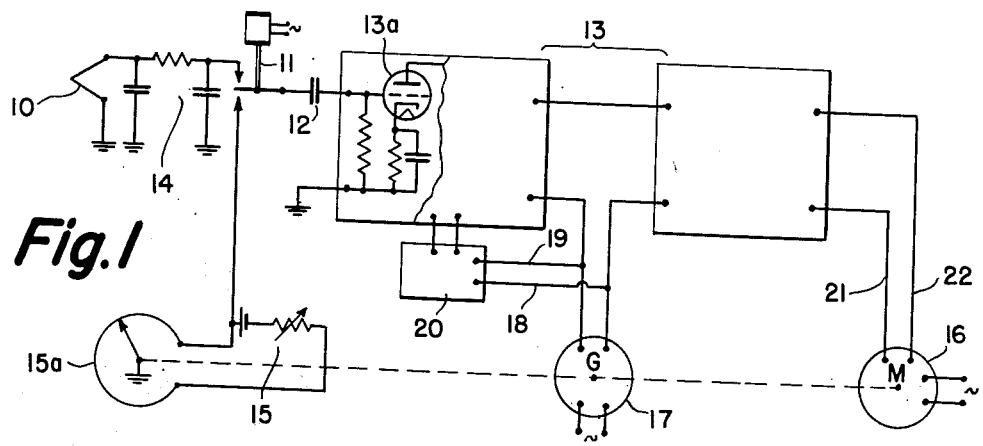
Figure 2:
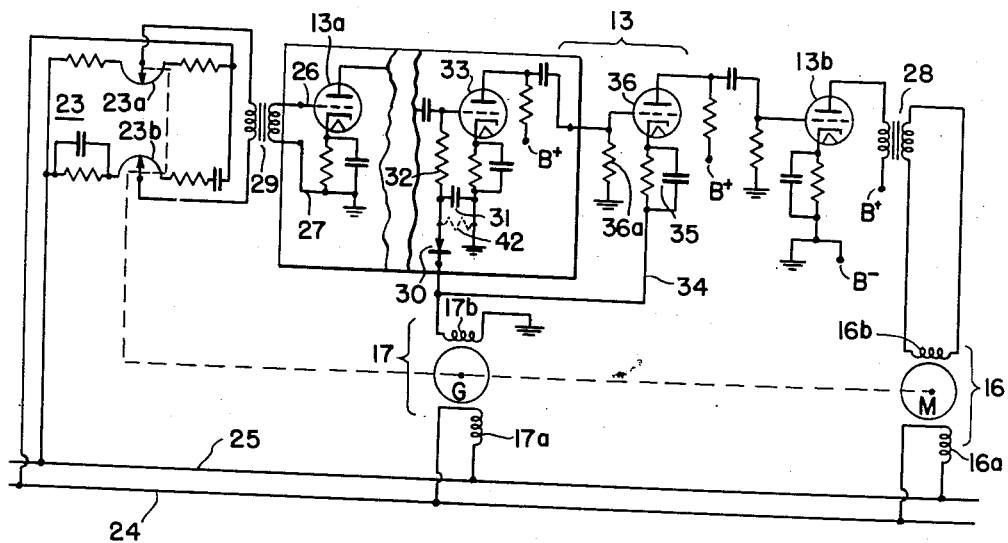

For further objects and advantages of the invention, reference is to be had to the following detailed description taken in conjunction with the accompanying drawings, in which:

Fig. 1 is a wiring diagram partly in block form illustrating one form of the invention; and Fig. 2 is a wiring diagram showing more in detail the circuits forming an essential part of the present invention but with an input circuit differing from that of Fig. 1.

Referring to the drawings, there has been shown in Fig. 1 a system suitable for the measurement of any variable quantity or condition such as temperature, pressure, pH, and the like, the input circuit being selected in accordance with the requirements of the particular application in manner well understood by those skilled in the art.

In Fig. 1, the input circuit of the system is illustrative of applications where the unknown voltage representative of the magnitude of the condition is of unidirectional character such as from a thermocouple 10 and which is applied by converter or vibrator 11 by way of coupling capacitor 12 to the first stage 13a of amplifier 13. Preferably, there is included in the input circuit a filter 14 to minimize or attenuate application of undesired alternating current signals to the amplifier 13. As fully explained in my aforesaid patents, the input signal applied to the first stage 13a of the amplifier will be of one phase or of the opposite phase, depending upon whether the voltage of thermocouple 10 is greater or less than that applied by a potentiometer network 15 which includes a slidewire 15a to the converter 11 and thence to the input circuit of stage 13a. The slidewire 15a is adjusted by a motor 16 to reduce to zero the unbalance voltage applied to converter and to the input circuit of the first stage 13a of the amplifier.

Though the vibrator or converter 11, of the polarized type, may be operated at any desired frequency, it is general practice to connect it to 60-cycle alternating-current lines, the vibrator alternately connecting the thermocouple 10 and the voltage developed by the potentiometer circuit 15 to the condenser 12 sixty times per second. Accordingly, the motor 16 may be of the alternating current type with one winding continuously energized from the same source of alternating-current supply as the vibrator 11, the other motor winding being energized from the output stage of the amplifier 13.

In accordance with the present invention, the speed of the motor 16 at all times is substantially proportional to the square root of the unbalance-signal or voltage applied to the input circuit of the first stage 13a of the amplifier 13. That speed control is accomplished by providing a tachometer 17 of the alternating-current type, the rotor of which is driven by the motor 16 and utilizing the generated voltage in manner now to be described. That voltage is applied by conductors 18 and 19 to a gain control circuit 20 for varying the gain of one stage of the amplifier such as one following stage 13a. Since the output voltage of the tachometer 17 is of alternating character and of the same frequency as that applied to the motor 16 and to the converter 11, the gain control device 20 includes a rectifier functioning in manner to be described in connection with the more detailed circuit of Fig. 2. In order that the amplitude of the alternating-current output of tachometer 17 shall vary in accordance with the speed of the motor 16, there is supplied to the tachometer 17 alternating current from the same source as that which supplies current to the motor 16 and to vibrator 11. This will be described more in detail in connection with Fig. 2. By introducing the alternating-current output of tachometer 17 into the output circuit of a selected later stage of the amplifier 13, the energization of the motor 16 by way of output conductors 21 and 22 is controlled in manner to assure at all times that the speed of motor 16 will be substantially proportional to the square root of the unbalance-signal.

In Fig. 2 a condition-sensing circuit has been illustrated comprising a frequency-responsive bridge 23 of the type disclosed in Wunsch Patent 1,751,538. The frequency bridge 23 is connected to alternating-current supply lines 24 and 25. Any change in the frequency of the alternating-current supply produces across the input conductors 26 and 27 of the amplifier 13, by way of transformer 29, an alternating-current signal whose amplitude varies in accordance with the extent of unbalance of the bridge 23 and the phase of which depends upon the direction of deviation of the frequency from its preceding value. As shown, the unbalance-signal from the bridge 23 is applied to the first stage 13a of the amplifier. The tachometer 17 is driven by the motor 16 which also adjusts the slide-wires 23a and 23b of the bridge 23. The tachometer is provided with a field winding 17a continuously energized from the alternating-current supply lines 24 and 25. The motor winding 16a is similarly energized from lines 24 and 25. The other motor winding 16b is energized from the output, or from power tube 13b, of the amplifier by way of output transformer 28. The tachometer 17 develops across a second winding 17b thereof an alternating-current voltage whose phase depends upon the direction of rotation of tachometer 17 and whose amplitude depends upon its speed of rotation. The voltage developed across the winding 17b is utilized in two different ways. First, it is applied to a gain controlling circuit including a rectifier 30 and an impedance element shown as capacitor 31. The capacitor 31 acquires a charge and develops a biasing voltage applied by way of grid resistor 32 to the grid of the electric valve 33 forming an intermediate and early stage of amplifier 13. The rectifier 30 is connected in the gain-controlling circuit with a polarity such that as the amplitude of the applied alternating-current voltage increases regardless of the phase thereof, an increase in the voltage of capacitor 31 applies an increased negative bias to the grid of tube 33, thus decreasing the gain thereof. The tube 33 is of the variable mu type, the gain thereof varying inversely with the magnitude of the negative bias applied to its control grid.

The voltage developed across winding 17b of tachometer 17 is also applied in phase-opposition to the alternating-current output from tube 33, as by the conductor 34, grid-biasing means 35 of tube 36, forming a driver stage for the power tube 13b, grid resistor 36a to ground. The other connection from winding 17b is by way of the ground connection. The input to the power stage, tube 13b, is of course the resultant of the opposed voltages.

The manner in which the voltage across winding 17b is utilized in procurement of a speed of operation of the motor 16 substantially proportional to the square root of the unbalance may also be understood by the following analysis. If there be now considered only the introduction of the voltage across winding 17b in the output circuit of the tube 33, it will be seen that the speed of the motor 16 will be controlled so that the voltage output of the tachometer, i. e., across winding 17b, will always very nearly balance the output of tube 33. Accordingly, the output of the amplifier including tube 33 will be proportional to motor speed. It will also be seen that the input of the amplifier including tube 33 times the gain of the several stages up to and including tube 33 will express the output of that part of the amplifier. Hence, since the output including tube 33 is proportional to speed, it may be stated that the input is proportional to the speed multiplied by the reciprocal of the gain.

Inasmuch as the gain of tube 33 is made inversely proportional to the negative bias developed across capacitor 31, the magnitude of which is proportional to the amplitude of the alternating-current voltage appearing across winding 17b, that amplitude in turn being proportional to the speed of motor 16, it will be seen that the speed of motor 16 is proportional to the reciprocal of the gain of amplifier stage 33. Accordingly, the results of the control of the gain of amplifier 33 and the introduction of the voltage in phase-opposition to the output thereof establish a relationship such that the speed of the motor 16 will be proportional to the square root of the input to the amplifier stage 33, or conversely, the square of the speed of motor 16 will be proportional to the voltage input to the amplifier stage 33.

Moreover, since the voltage input to the stage 33 is directly proportional to the unbalance voltage developed by the frequency bridge 23, there is established the relationship that the speed squared of the motor 16 is at all times proportional to the unbalance voltage. Thus, there is accomplished the objective of the present invention; namely, that the speed of the motor 16 shall be proportional to the square root of the unbalance, this objective being attained by means of the alternating current tachometer 17 and the relatively simple circuit arrangements provided therefor. The system is universal in that it is equally applicable to measuring systems having input circuits to which there are applied unidirectional voltages or currents and to input circuits to which there may be applied alternating currents.

The alternating-current tachometer 17 may be constructed in manner well understood by the art, such for example as described in Riggs Patent No. 2,115,086.

In the present invention it is preferred that there be utilized the alternating-current tachometer 17, though it is to be understood that other means of obtaining an alternating current voltage whose amplitude varies with the speed of the motor and whose phase is dependent upon the direction of rotation of the motor may be utilized, such as circuits deriving such a voltage from the motor windings themselves. Instead of a single or half-wave rectifier, a full-wave rectifier may also be used. It is further to be understood that where two-phase induction motors of the type which accelerate to maximum speed are utilized, the foregoing discussion, as to the control of motor speed to be proportional to the square root of the unbalance signal, is particularly applicable to the control of the speed of the motor as it is reduced from its maximum speed to zero. The latter is the condition of operation during which the motor speed must be controlled to bring the network into balance without overshooting or undershooting of the adjustment of the impedance means, shown in Fig. 1 as comprising the slidewire 15a, and in Fig. 2 as comprising the slidewires 23a and 23b.

While a preferred modification of the invention has been illustrated, it is to be understood other modifications may be made within the scope of the appended claims, such for example as the inclusion of a resistor 42 across capacitor 31. Such a resistor would be of relatively high value to provide a discharge path for capacitor 31 in the event a rectifier 30 be utilized having substantially infinite impedance to current flow in a direction opposite to that indicated by the arrow.

What is claimed is:

1. A self-balancing system comprising an electrical network unbalanced in response to variation in magnitude of a condition, adjustable impedance means for effecting balance of said network, a motor for adjusting said impedance means, an alternating-current amplifier, an alternating-current tachometer for producing a voltage whose amplitude is proportional to the speed of said motor and whose phase is determined by the direction of rotation of said motor, a gain-controlling circuit for said amplifier including a rectifier, means for applying to said gain-controlling circuit said voltage of said tachometer, means for applying said voltage of said tachometer in phase opposition to an input voltage of said amplifier, and means for controlling the operation of said motor in accordance with the resultant output voltage from said amplifier for operation of said motor at a speed which varies substantially as the square root of the unbalance voltage applied to the input circuit of said amplifier.

2. A self-balancing system unbalanced in response to variation in magnitude of a condition comprising adjustable means for rebalancing said system, a motor for adjusting said means, a second means for controlling the speed of said motor so that it varies in accordance with the square root of said unbalance of the system comprising means for producing a signal whose amplitude varies with the speed of said motor and whose direction of action is determined by the direction of motion of said motor, an amplifier for amplifying said unbalance, control means varying the amplification of said unbalance as a function of the magnitude of the signal varying as a function of the speed of the motor, and means for opposing an output of said amplifier and the signal varying as a function of the speed of the motor.

3. A self-balancing system comprising an electrical network unbalanced in response to change in magnitude of a condition, adjustable impedance means for rebalancing said network, a motor for adjusting said impedance means, an alternating-current amplifier for amplifying the unbalance voltage of said network, means for producing an alternating-current voltage whose amplitude is a function of the speed of the motor and whose phase is determined by the direction of rotation of said motor, said amplifier having an output circuit to which said voltage having a magnitude varying as a function of the speed of the motor is applied in phase opposition to an alternating-current output of said amplifier, said amplifier including a gain-controlling circuit for inversely varying the gain of the amplifier in accordance with the amplitude of the voltage whose amplitude is a function of the speed of the motor, and a motor-energizing circuit controlled by said amplifier for controlling the motor speed to maintain it substantially proportional to the square root of the unbalance voltage of said network.

4. A self-balancing system comprising a network unbalanced in response to variation in magnitude of a condition, adjustable impedance means for balancing said network, a multi-stage alternating-current amplifier having an output circuit, a motor for adjusting said impedance means having at least one winding energized under the control of said amplifier, means for applying the unbalance voltage of said network to the first stage of said amplifier for amplification thereby, means for producing an alternating-current voltage whose amplitude varies with the speed of said motor and whose phase reverses with reversal of rotation of said motor, means for introducing said last-named voltage into a subsequent stage of said amplifier in phase opposition to the output voltage thereof, and means including a rectifier for varying the gain of a preceding stage of said amplifier in accordance with the amplitude of said last-named voltage regardless of phase thereof.

5. A self-balancing system comprising a network unabalanced in response to variation in magnitude of a condition, adjustable impedance means for balancing said network, a multistage alternating-current amplifier having an output circuit, a motor for adjusting said impedance means having at least one winding energized under the control of said amplifier, means for applying the unbalance voltage of said network to the first stage of said amplifier for amplification thereby, means for introducing into a subsequent stage of said amplifier in phase opposition to the output voltage thereof an alternating-current voltage whose amplitude varies with the speed of said motor and whose phase reverses with reversal of rotation of said motor, and means including a rectifier for varying the gain of a preceding stage of said amplifier in accordance with the amplitude of said last-named voltage regardless of phase thereof.

6. A self-balancing system comprising adjustable impedance means for rebalancing the system, a motor for adjusting said impedance means, an alternating-current amplifier for amplifying an alternating-current voltage whose amplitude is proportional to the deviation from the balance-position of said impedance means, means operable in response to the speed of said motor for varying the gain of said amplifier inversely with the speed of said motor, and voltage means responsive to the speed of said motor for opposing an output voltage of said amplifier, whereby the speed of said motor is maintained substantially equal to the square root of the extent of the unbalance of said system.

7. A self-balancing system comprising adjustable impedance means for rebalancing the system, a motor for adjusting said impedance means, an alternating-current amplifier for amplifying an alternating-current voltage whose amplitude is proportional to the deviation from the balance-position of said impedance means, means operable in response to the speed of said motor for varying the gain of said amplifier inversely with the speed of said motor, and means responsive to the speed of said motor for opposing an output voltage of said amplifier, said amplifier including a power stage operable by the resultant of said opposed voltages for producing a speed of said motor substantially equal to the square root of the extent of the unbalance of said system.

8. A self-balancing system comprising a network unbalanced in response to variation in magnitude of a condition, adjustable impedance means for balancing said network, a multistage alternating current amplifier having an input circuit preceding each stage and an output circuit following each stage of said amplifier, a variable speed motor for adjusting said impedance means having at least one winding energized under the control of said amplifier, means for applying the unbalance voltage of said network to the input circuit of the first stage of said amplifier for amplification thereby, means including a rectifier and a circuit element connected in the input circuit of a stage of said amplifier for developing in said last-named input circuit a negative bias of magnitude varying with the speed of the motor for decreasing the gain of the amplifier as the speed of the motor increases and for increasing the gain of the amplifier as the motor speed decreases, and circuit connections including a stage of the amplifier following said last-named stage for developing in phase opposition with the output thereof an alternating-current voltage whose amplitude varies with the speed of said motor and whose phase reverses with reversal of rotation of said motor, the motor speed thereby being at all times substantially proportional to the square root of the unbalance applied to the input circuit of said first stage.

9. The combination set forth in claim 8 in which the said circuit element is in series in the input circuit of an intermediate stage of the amplifier and comprises a capacitor and in which the circuit connections in the output circuit of a later stage of the amplifier include a winding across which there is developed an alternating-current voltage whose amplitude varies with the speed of said motor.

10. A control system comprising a multi-stage alternating-current amplifier having an input circuit preceding each stage and an output circuit following each stage of said amplifier, a variable speed motor having at least one winding energized under the control of said amplifier, means for applying a signal to the input circuit of the first stage of said amplifier for amplification thereby, means connected in the input circuit of a stage of said amplifier for developing in said last-named input circuit a negative bias of magnitude varying with the speed of the motor for decreasing the gain of the amplifier as the speed of the motor increases and for increasing the gain of the amplifier as the motor speed decreases, and circuit connections including a stage of the amplifier following said last-named stage for developing in phase opposition with the output thereof an alternating-current voltage whose amplitude varies with the speed of said motor and whose phase reverses with reversal of rotation of said motor, the motor speed thereby being controlled at all times to be substantially proportional to the square root of the input signal applied to the input circuit of said first stage.

11. A control system comprising a multi-stage alternating-current amplifier having an input circuit preceding each stage and an output circuit following each stage of said amplifier, a variable speed motor having at least one winding energized under the control of said amplifier, means for applying a signal to the input circuit of the first stage of said amplifier for amplification thereby, means including a rectifier and a circuit element connected in the input circuit of a stage of said amplifier for developing in said last-named input circuit a negative bias of magnitude varying with the speed of the motor for decreasing the gain of the amplifier as the speed of the motor increases and for increasing the gain of the amplifier as the motor speed decreases, and circuit connections including a stage of the amplifier following said last-named stage for developing in phase opposition with the output thereof an alternating-current voltage whose amplitude varies with the speed of said motor and whose phase reverses with reversal of rotation of said motor, the motor speed thereby being controlled at all times to be substantially proportional to the square root of the input signal applied to the input circuit of said first stage.

12. The combination set forth in claim 11 in which the said circuit element is in series in the input circuit of an intermediate stage of the amplifier and comprises a capacitor and in which the circuit connections in the output circuit of a later stage of the amplifier include a winding across which there is developed an alternating-current voltage whose amplitude varies with the speed of said motor.

13. A control system comprising a multi-stage alternating-current amplifier having an input circuit preceding each stage and an output circuit following each stage of said amplifier, a variable speed motor having at least one winding energized under the control of said amplifier, means for applying a signal to the input circuit of an early stage of said amplifier for amplification thereby, means including a rectifier and a capacitor connected in an input circuit of a stage of said amplifier for developing in said last-named circuit a negative bias of magnitude varying with the speed of the motor for decreasing the gain of the amplifier as the speed of the motor increases and for increasing the gain of the amplifier as the motor speed decreases, and circuit connections including a stage of the amplifier following said last-named stage including a winding across which there is developed an alternating-current voltage whose amplitude varies with the speed of said motor for opposing in phase opposition the output of said amplifier, the motor speed thereby being controlled at all times to be substantially proportional to the square root of the signal applied to said early stage of said amplifier.

14. A self-balancing system comprising an electrical network unbalanced in response to variation in magnitude of a condition, adjustable impedance means for rebalancing said network, a motor for adjusting said impedance, means for controlling the speed of said motor so that it varies in accordance with the square root of the unbalance of said network comprising means for producing an alternating-current voltage whose amplitude varies with the speed of said motor and whose phase is determined by the direction of rotation of said motor, an alternating-current amplifier for amplifying the unbalance voltage of said network, gain-control means varying the amplification of said unbalance voltage as a function of the magnitude of the voltage varying as a function of the speed of the motor, and means for opposing in an output circuit of said amplifier the output thereof and the voltage varying as a function of the speed of the motor.

ALBERT J. WILLIAMS, JR.

No references cited.